UNITED STATES PATENT OFFICE.

GUSTAV ROTH, OF OLMÜTZ, AUSTRIA-HUNGARY.

PROCESS FOR THE MANUFACTURE OF YEAST FROM MOLASSES.

1,170,110.   Specification of Letters Patent.   Patented Feb. 1, 1916.

No Drawing.   Application filed March 28, 1914.   Serial No. 827,816.

*To all whom it may concern:*

Be it known that I, GUSTAV ROTH, a subject of the Emperor of Austria-Hungary, residing at Olmütz, Moravia, Austria-Hungary, have invented new and useful Improvements in Processes for the Manufacture of Yeast from Molasses, of which the following is a specification.

The treatment of molasses for the manufacture of yeast, offers as is well known certain difficulties, more particularly in hot weather. Moreover, the results are not uniform. Now and then the yeast is of excellent quality but frequently it has a bad color and is frequently infected. Moreover it is known that molasses of different origins are by no means of equal value for the manufacture of yeast by the processes hitherto used.

The present invention solves the problem of manufacturing yeast from molasses in a uniform and reliable manner, with or without the aid of the lactic acid process.

The usual method heretofore employed for obtaining wort by using exclusively mineral acids (that is to say, without the production of lactic acid by a bacterial process) takes place as is well known in the following manner: The molasses is first diluted with water, neutralized with mineral acid (sulfuric acid or hydrochloric acid) or, more correctly speaking, mixed with a slight excess of acid, until a degree of acidity of about 1.5 per 100 cubic centimeters of mixture is obtained, and thereupon boiled by steam, until the molasses when cooled, separates a dark mud and becomes sufficiently clear and contains the whole of the sugar contents in the form of dextrose. After settling, the entire mass of clear solution is run into the preliminary mashing tun, brought to the desired concentration and acidity, mixed with malt and then introduced into the clarifying vats.

When employing simultaneously the lactic acid production by the bacterial method, the usual processes for obtaining the wort, are as follows: The molasses which has been clarified in the above described manner by acidifying with mineral acids and by boiling are left to acidify in the preliminary mashing vat after the soaking of the malt therein. (The soaking of the malt can however be effected also after the acidifying process.) For starting the acidifying, lactic acid bacteria are cultivated by means of a small amount of a setting in mash prepared from grist of dried malt and ground rye or there is added a corresponding quantity of a suitably acidified principal mash (obtained from a previous operation). When the desired degree of acidity is reached, the mash is heated to 75° C. for the purpose of sterilizing, and then transferred into the clarifying vat.

After long experiments, I have found that a solution of molasses, diluted in the usual manner, acidified and drawn off clear after boiling, still contains impurities. These impurities separate in a very fine suspension when the molasses is diluted a second time, mixed with acid and strongly stirred or aerated. As scientific explanation for this precipitation, it appears probable that certain of the colloidal matters in the molasses, by the action of this second dilution and acidification, together with the stirring or aeration, are converted from the "sol" condition into the "gel" condition. This conversion makes the said matters readily separable from the molasses solution. If the solution of molasses is deprived of the separated finely divided impurities by suitable filtration, it is a bright clear liquid, by treating which a yeast of excellent and uniform quality is always obtained. Another advantage of this process consists in the fact that the solution of molasses can be brought directly into the fermenting tun and mixed therein with clear extracts introducing nitrogen-containing ingredients into the wort. The further purification of the already cleared solution of molasses, introduced according to this invention between the old stages of working, therefore makes the clarifying over malt superfluous. This not only considerably simplifies the working, but, which is still more essential, imports the removal of a dangerous accidental factor. The latter consists in the fact that the malt in the clarifying processes hitherto used, holds back sometimes more and sometimes less, fine impurities contained in the apparently perfectly clear molasses, which impurities, as has been proved by exact experiments, endanger to a high degree the good quality of the yeast, and therefore are of the greatest importance for the quality.

When lactic acid formation is used, the solution of molasses purified according to this invention, is mixed with clear nitrogen containing extracts, such as distiller's wash, nourishing salts or the like. After the addition of a powerful lactic acid ferment (in the form of clear wort) the solution is left for several hours to acidify and is finally brought into the fermenting vat. The clarifying process is therefore done away with also in this case. Of course, the process could also be carried out so that a portion of the lactic acid, or even the whole quantity, would be produced before the filtration of the molasses.

As examples of carrying out the process the following may be mentioned: The molasses is diluted to about 35° Balling, and acidified with sulfuric acid to about 4 cubic centimeters per 100 cubic centimeters of mixture, whereupon, according to their nature, they are boiled for several hours in the known manner and then left to stand until clarified. The clear solution of molasses drawn off, is then further diluted to about 20° Balling, and acidified with sulfuric acid to about 6–10 cub. centimeters per 100 cubic centimeters of mixture. The solution is then preferably aerated for some time. The impurities then separate in a state of an extraordinarily fine division, and must be removed completely by careful filtration. When mineral acid is exclusively used, the molasses thus purified is brought directly into the fermenting vat, and mixed with clear nitrogen-containing extracts, distillers' wash, nourishing salts or the like in order to be pitched with yeast. When lactic acid fermentation is simultaneously used, the purified bright clear solution of molasses is mixed in an acidifying vat with clear nitrogen-containing extracts, distillers' wash and nourishing salts, diluted to about 14° Balling and after the addition of a culture of lactic acid bacteria in the form of clear wort at 50–60° left to stand for the purpose of acidifying. After the desired degree of acidity is reached, the solution is fermented by the addition of yeast as above.

To make the process successful, it is essential to carry out the filtration properly by which the molasses is deprived of the impurities separated as a fine suspension. It has been found advantageous to carry out the filtration without pressure and to employ a large filtering surface.

The impurities separating in the form of a suspension, are so finely divided that in the case of a filtration with pressure they would be carried through the finest filtering material. In that way, however, the efficiency of the process would be reduced, or in certain cases, completely destroyed. The impurities precipitated represent ingredients which are present in the molasses in colloidal state and which must be removed in order to give the yeast a pure and sound "nourishing ground." If even as much as a few cubic centimeters of this suspended matter were left in the molasses wort, the whole of the yeast obtained from the corresponding mash would be liable to be injured. This drawback is avoided in a reliable manner by the filtration according to this invention taking place slowly and without pressure. In order to compensate for the slow working due to filtration without pressure, it is advisable to use large filtering surfaces.

I claim:

1. In the process of producing yeast from molasses, the improvement in the preparation of a clear wort which comprises diluting the molasses in the usual manner, acidulating the same, boiling the diluted and acidulated molasses, and drawing off the clear liquid, further diluting and acidulating the liquid to a sufficient extent to cause the separation of finely divided suspended matter, and thereafter separating the clear liquid from the said suspended matter.

2. In the process of producing yeast from molasses, the improvement in the preparation of a clear wort which comprises diluting the molasses in the usual manner, acidulating the same, boiling the diluted and acidulated molasses, and drawing off the clear liquid, further diluting and acidulating the liquid to a sufficient extent to cause the separation of finely divided suspended matter, and thereafter separating the clear liquid from the said suspended matter, by filtration at atmospheric pressure, over a large filtering surface.

3. In the process of producing yeast from molasses, the improvement in the preparation of a clear wort which comprises diluting the molasses in the usual manner, acidulating the same, boiling the diluted and acidulated molasses, and drawing off the clear liquid, further diluting and acidulating the liquid to a sufficient extent to cause the separation of finely divided suspended matter, stirring or aerating the liquid and thereafter separating the clear liquid from the said suspended matter, then adding a clear nitrogenous extract and fermenting.

4. In the process of producing yeast from molasses, the improvement in the preparation of a clear wort which comprises diluting the molasses in the usual manner, acidulating the same, boiling the diluted and acidulated molasses, and drawing off the clear liquid, further diluting and acidulating the liquid to a sufficient extent to cause the separation of finely divided suspended matter, then stirring or aerating the liquid and thereafter separating the clear liquid from the said suspended matter, then mixing the liquid with a clear nitrogenous extract, then adding lactic acid bacteria in the form of clear wort, leaving the solution to acidify, and then fermenting.

5. A process of producing yeast from molasses which comprises the successive steps of (1) diluting, (2) acidifying, (3) boiling, (4) drawing off the clear liquor (5) further diluting, (6) further acidifying sufficiently to cause a precipitation of finely divided matter (7) stirring or aerating, (8) removal of the finely divided precipitated matter, and thereafter (9) fermenting.

GUSTAV ROTH.

Witnesses:
    JOSEPH E. STADLER,
    KARL GRUBER.